(12) United States Patent
Banerjee et al.

(10) Patent No.: US 7,849,055 B2
(45) Date of Patent: Dec. 7, 2010

(54) METHOD AND SYSTEM FOR LIMITING INSTANCES OF A CLIENT-SERVER PROGRAM WITHIN A RESTRICTED DISTRIBUTED NETWORK

(75) Inventors: Dwip N. Banerjee, Austin, TX (US); Ranadip Das, West Bangal (IN); Sandeep R. Patil, Vimannagar (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/874,324

(22) Filed: Oct. 18, 2007

(65) Prior Publication Data
US 2009/0106348 A1 Apr. 23, 2009

(51) Int. Cl.
*G06F 17/00* (2006.01)
(52) U.S. Cl. ................. 707/609; 707/705; 707/608; 709/203
(58) Field of Classification Search ................. 707/1, 707/600, 609, 705; 709/201, 203
See application file for complete search history.

(56) References Cited

U.S. PATENT DOCUMENTS

| | | | |
|---|---|---|---|
| 3,938,570 A | 2/1976 | Stewart | |
| 6,119,742 A | 9/2000 | Maeng | |
| 6,128,710 A | 10/2000 | Greenspan et al. | |
| 6,202,723 B1 | 3/2001 | Maeng | |
| 6,328,191 B1 | 12/2001 | Conley | |
| 6,542,926 B2 | 4/2003 | Zalewski et al. | |
| 6,941,379 B1 * | 9/2005 | Dingsor et al. | 709/235 |
| 7,054,927 B2 * | 5/2006 | Ulrich et al. | 709/223 |
| 7,058,948 B2 | 6/2006 | Hoyle | |
| 7,111,731 B2 | 9/2006 | Pratt et al. | |
| 7,162,542 B2 * | 1/2007 | Abjanic et al. | 709/246 |
| 7,222,119 B1 | 5/2007 | Ghemawat et al. | |
| 7,361,097 B2 | 4/2008 | Hot | |
| 7,506,041 B1 * | 3/2009 | Shelton et al. | 709/223 |
| 2002/0052914 A1 | 5/2002 | Zalewski et al. | |
| 2002/0113105 A1 | 8/2002 | Jarman | |
| 2005/0016648 A1 | 1/2005 | Vakharia et al. | |
| 2005/0251500 A1 * | 11/2005 | Vahalia et al. | 707/1 |
| 2006/0201596 A1 | 9/2006 | Hwang | |
| 2006/0277261 A1 | 12/2006 | Paramasivam et al. | |
| 2008/0320352 A1 * | 12/2008 | Udell et al. | 714/739 |

* cited by examiner

*Primary Examiner*—Mohammad Ali
*Assistant Examiner*—Thuy (Tiffany) Bui
(74) *Attorney, Agent, or Firm*—Robert C. Rolnik; David A. Mims (57) ABSTRACT

The present invention provides a computer implemented method, data processing system and computer program product for limiting instances of a client-server program within a plurality of platforms in a restricted distributed network. The data processing system receives an invocation of the client-server program. The data processing system assigns a write file to the client-server program wherein the write file has a write file name and the write file is on a distributed file system accessible to the plurality of platforms. The data processing system determines whether the write file is available. Responsive to a determination that the write file is available, the data processing system opens the write file for writing wherein the write file is associated with the client-server program. The data processing system, responsive to a determination that the write file is available, forms an addressing file having addressing information of a first instance of the client-server program.

14 Claims, 5 Drawing Sheets

FIG. 3

| APPLICATION | UNIQUE FILE FOR LOCKING | XML FILE |
|---|---|---|
| WEB SERVICE | /mnt/global-distributed-space/web-services/lock_me | /mnt/global-distributed-space/web-services/server.xml |

```
<?xml version="1.0"?>
<Application Name="Web Service">
401  <IP>198.162.0.1</IP>
403  <Port>2001</Port>
405  <Version>1.0</Version>
407  <Start_Time>12:00:01 PM</Start_Time>
</Application>
```

METHOD AND SYSTEM FOR LIMITING INSTANCES OF A CLIENT-SERVER PROGRAM WITHIN A RESTRICTED DISTRIBUTED NETWORK

BACKGROUND OF THE INVENTION

1. Field of the Invention

The present invention relates generally to coordinating the operation of one or more instances of a program in a distributed file system. More particularly, the present invention relates a computer implemented method, data processing system, and computer program product to allow execution of an instance of a program based on availability of a file or operation of a business logic.

2. Description of the Related Art

In computing, a file system is a structure for storing and organizing computer files and the data they contain to make it easy to find and access the files. File systems may use a storage device such as a hard disk drive or CD-ROM and involve maintaining the physical location of the files, for example, as binary data encoded in magnetic domains on a magnetic disk. Alternatively, a file system may be a virtual file system. A virtual file system exists only as an access method for virtual data or for data over a network.

File systems are made of two types of data. The first type of data, which usually predominates, is user data. The content type of user data may be, for example, text, graphics, music, and computer instructions. The second type of data is file system metadata. File system metadata is all the data that is not the user's data. Metadata can inform a processing system of the statistics, permissions, structures, and state information of the files containing user data. A user is a person that operates, accesses, senses or otherwise makes use of a data processing system.

A distributed file system is a network of one or more servers that respond to client requests to read, write and otherwise process files. A client is a computer that makes such requests. An advantage of a distributed file system is that a file resident on a server may be shared with several clients, and the server may restrict and coordinate writes to such a file so that only one user may change a file at a time.

Many distributed file systems implement security to limit access to files and other resources. Such systems may exclude a user from accessing a file or other resources. A restricted distributed network is a network that provides file access to a user according to preset rules based on the user's identity. An initial step to excluding access is establishing a user's identity. Kerberos is an example of an authentication mechanism that provides verified identities for users, hosts, and processes. The Kerberos system provides infrastructure for authentication through a key distribution center. Each principal (one of the three mentioned) shares a secret encryption key with a key distribution center. A properly authenticated user may obtain a ticket granting ticket (TGT) from the key distribution center.

A user having a ticket granting ticket may request a service ticket. That is, the user may request a pairing of the user identity with a service, such as an application invocation. Further mechanisms may determine if the user is authorized to access the service or file.

Several people or administrators may administer a modem distributed file system. The administrators maintain, restore, and upgrade the network's hardware and software. Programs, such as client-server programs and web services, may be licensed to operate under certain limitations within a distributed file system. The licenses may be limited to operate at a certain version level, or on a limited number of data processing systems on the distributed files system of an organization. The licensee of the program may have agreed to a limit of the number of instances. It may be difficult to determine which among a plurality of platforms is executing an instance of the program. A platform is an operating system executing on a processor of a distributed file system or other network. Because a network may have heterogeneous platforms, it may be complicated to account for instances across a network. In other words, one platform of the network may operate a Linux® operating system, while another platform of the network may operate an IBM AIX® operating system. Linux®) is a trademark of Linus Torvalds in the United States and several other countries. AIX is a registered trademark of International Business Machines Corporation.

Thus, it would be beneficial to coordinate automatically, between and within processors of a network, an indication that an instance is running. Moreover, it would also be helpful to focus requests of further instances to a first instance or any later added instance that operates as a proxy for the first instance.

SUMMARY OF THE INVENTION

The present invention provides a computer implemented method, data processing system, and computer program product for limiting instances of a client-server program within a plurality of platforms in a restricted distributed network. The data processing system receives an invocation of the client-server program. The data processing system assigns a write file to the client-server program wherein the write file has a write file name and the write file is on a distributed file system accessible to the plurality of platforms. The data processing system determines whether the write file is available. Responsive to a determination that the write file is available, the data processing system opens the write file for writing wherein the write file is associated with the client-server program. The data processing system, responsive to a determination that the write file is available, forms an addressing file having addressing information of a first instance of the client-server program. The data processing system determines that the write file is available, reports the addressing file by writing addressing information to the addressing file, wherein the addressing file is established at a predetermined logical location in the distributed file system. The data processing system responsive to the determination that the write file is available, executes at least one instruction of the client-server program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
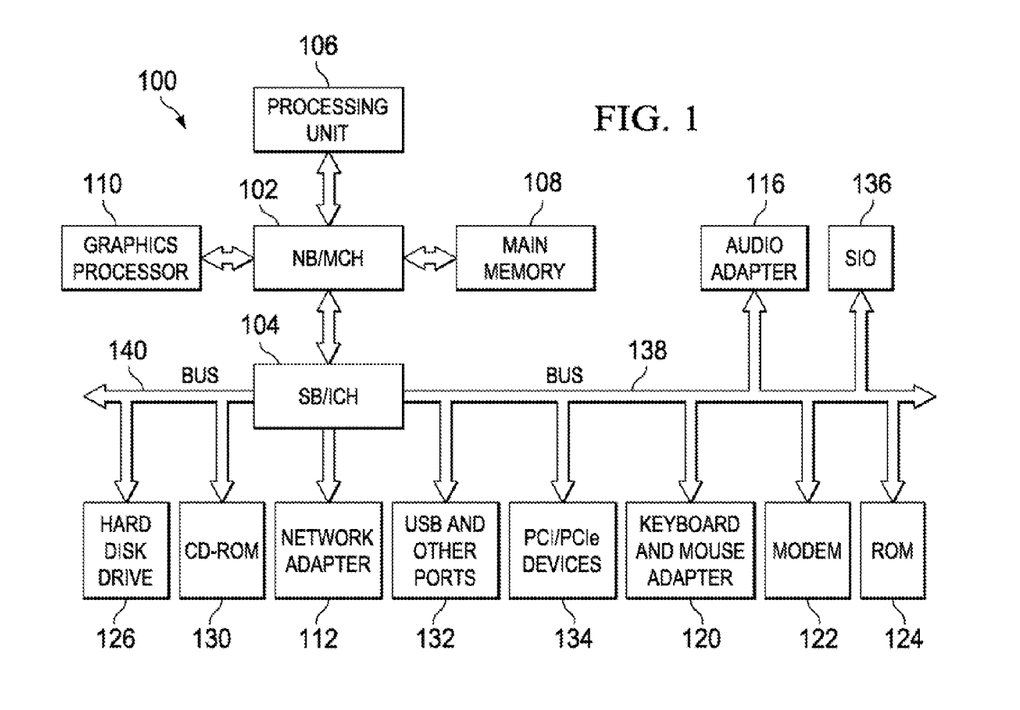
FIG. 1 is a data processing system in accordance with an illustrative embodiment of the invention.

With reference to FIG. 1, a block diagram of a data processing system is shown in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 are connected to north bridge and memory controller hub 102. Graphics processor 110 may be connected to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention are performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 and above-described examples are not meant to imply architectural limitations. For example, data processing system 100 also may be a tablet computer, laptop computer, or telephone device in addition to taking the form of a PDA.

Figure 2:
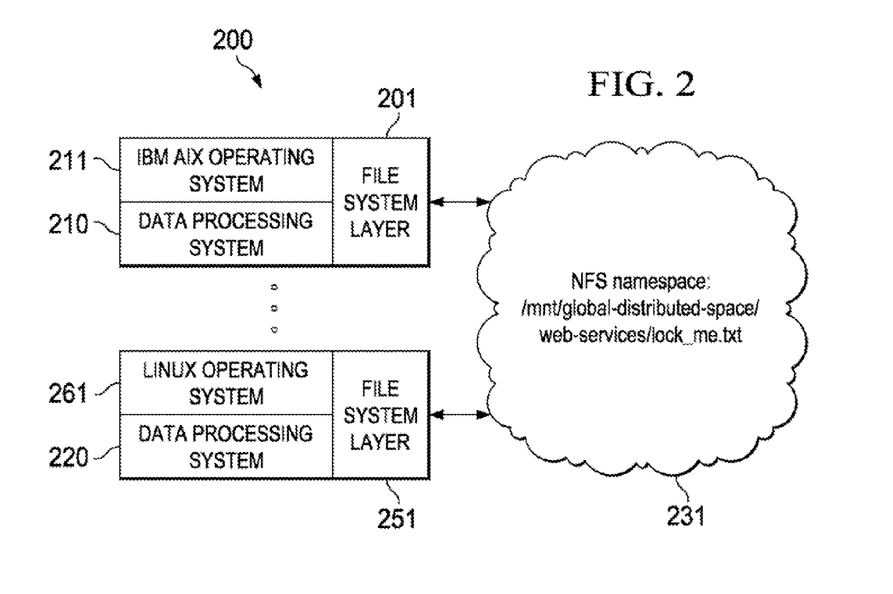
FIG. 2 shows a distributed file system in accordance with an illustrative embodiment of the invention.

FIG. 2 shows a distributed file system in accordance with an illustrative embodiment of the invention. Distributed file system 200 is comprised of a plurality of heterogeneous platforms. In particular, a distributed system uses a network to communicate file requests and data between and among the platforms. For example, network adapter 112 of FIG. 1 may be a source for, and a destination of, requests and responsive data streams. A platform may rely on, for example, hardware that is a symmetric multiprocessor, parallel processor, the data processing system of FIG. 2, or any other computer architecture. A distributed file system makes available files from multiple platforms to requesting users and applications. The files can be accessed over a network, and requests may be subjected to authentication and contention limitations established by processes or daemons of the platforms. Distributed file system 200 may be a restricted distributed network. A restricted distributed network restricts program execution based on a user being authenticated and authorized to access a file or invoke a program.

A first platform can be an IBM AIX® platform. IBM AIX® operating system 211 operates on data processing system 210. Data processing system 210 may be an example of data processing system 100 of FIG. 1. Data processing system 210 provides low-level file support and housekeeping functions to file system layer 201, which in turn supports the functions of distributed file system 200.

In a distributed file system implementing, for example, a network file system (NFS V4), a client platform may make an NFS request to a platform supporting an AIX® operating system. For example, an AIX system can respond to an NFS operation to open a file. The AIX® system may obtain a file descriptor using "open("/dir/foo")." Next, the AIX® system can lookup the file handle for the file, in this case, "foo." The AIX® system can record a mapping from the file descriptor to a file handle known in a NFS system. Lastly, the AIX® system can set an initial file offset to zero, as well as return a file descriptor to the client platform making the NFS open request.

As described above, a distributed file system can be, for example, network file system (NFS V4), Andrew File System (AFS), or Server Message Block (SMB), among others. In the example of FIG. 2 and subsequent figures, the distributed file system is NFS V4.

A second platform can be a Linux® platform. Linux® operating system 261 operates on data processing system 220. Data processing system 220 provides low-level file support and housekeeping for files requested by the Linux® platform, as well as files requested by other data processing systems of the distributed file system. It is appreciated that a platform may rely upon a virtual machine manager, for example, a hypervisor, for access to hardware resources. As a result, multiple operating systems may exist on a data processing system.

File system layer 201 and file system layer 251 are configured to check authentication of the user, process or other entity that makes the file requests within the domain of the respective platform. In the example of FIG. 2, the distributed file system may operate according to the NFS V4. Accordingly, files exist in a namespace such that each file has a unique logical location determined by a name and one or more subdirectories and or mounted drives. Thus, a logical location is a path that has at least a one to one relationship with a file. Consequently, a logical location may correspond to a file, or multiple logical locations may correspond to a file. Optionally, the logical location may correspond to a specific physical device. For example, within network file system 231 is a table or other data-structure that includes a logical location for a file, for example, /mnt/global-distributed-space/web-services/lock_me.

Distributed file system 200, described above, hosts one or more client-server programs. A client-server program may be stored and not operating. On the other hand, a client-server program may be invoked and running, for example, as a process on the host machine. A client-server program is a program that responds to requests from client software, for example, as may exist on a separate processor in a network. The client-server program may define services using a Web Services Description Language (WSDL). In addition, the client-server program may support Service Oriented Architecture Protocol (SOAP). Thus, one or more instances of a client-server program may be hosted on distributed file system 200.

As described above, a client-server program may be operated as an instance. An instance of a client-server program is the combined disk, memory, and/or registers storing a state of a program in progress on a processing unit. The state corresponds to a single invocation of the program. An example of a register may be a program's instruction pointer register used to hold a memory address of a next program instruction to execute. An instance count is a whole number corresponding to the several states that may exist when a program is invoked several times. The instances may operate concurrently on several processors, or share a common processor, each taking turns operating on the common processor. Thus, an instance count may increment when a new invocation of a program occurs. An instance count may decrement after an invocation of a program completes. For example, a web service may operate on data processing system 210. A user may later invoke a web service on data processing system 220. As a result, when an instance of the web service is running on each of data processing system 210 and data processing system 220, the instance count may be incremented to two.

An invocation of a client-server program is a command or request made by a user, a process, or other entity that requests execution of an available program such that, upon successfully executing the program, at least one instruction of the client-server program is executed on a processor. An invocation can be, for example, a remote procedure call, an execution of a command in a script or batch file, a hand-entered command at a command line, and the like. An instruction of the client-server program is a computer program instruction that may be interpreted or executed by a processor in a data processing system. An instruction may be, for example, a machine language instruction, or a line of interpreted language stored in a processing system's memory or non-volatile storage. A processor is a circuit configured to perform arithmetic or memory operations on data.

The aspects of the illustrative embodiments provide a computer implemented method, apparatus, and computer program product for limiting the number of instances on a plurality of computers that support a distributed file system. A user or application of an illustrative embodiment may invoke an instance of a program, check the existence of another instance, and gracefully shutdown the instance responsive to the presence of a prior instance. In addition, under predetermined business logic, a second instance may exchange information with a first instance to determine that the second instance is better suited to operate in the distributed file system. Consequently, the second instance may takeover the data processing of the first instance and the first instance may terminate. Additional applications of the various embodiments will become apparent with reference to the figures below.

Figure 3:
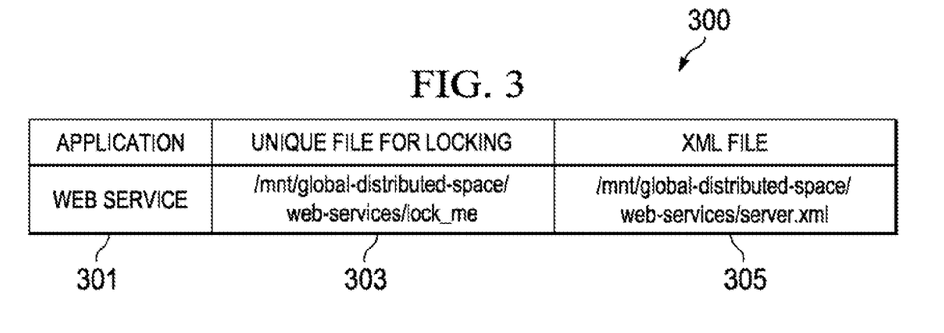
FIG. 3 is a table of client-server programs and associated files for locking and addressing files in accordance with an illustrative embodiment of the invention.

FIG. 3 is a table of client-server programs and associated files for locking and addressing files, in accordance with an illustrative embodiment of the invention. An administrator may establish the table in a file or other data structure to regulate the instance count of a client-server program or the host processor assignment of an instance. Alternatively, table 300 may be established automatically when a client-server program is installed. Each row of the table includes client-server program 301, write file name 303, and predetermined logical location in the distributed file system 305. In this case, client-server program 301 is "web services."

Table 300 includes write file name 303, which corresponds to a write file. A write file is a file having metadata that indicates if the file is opened for writing by any data processing system of a distributed file system. A write file name is a string that conforms to the naming conventions of the distributed file system and identifies the write file. The write file is accessible to the plurality of platforms that comprise the distributed file system. To say that a file is "opened for writing" is the same as saying that a file is "opened in write mode." A file opened for writing has one or more bits of metadata associated with the file that indicates to a processor that the file is opened and that a program instance may write to the write file.

The predetermined logical location in the distributed file system identifies an addressing file. An addressing file is a file created or modified by an instance to identify one or more methods to address and communicate with the instance. An addressing file can be, for example, a comma separated set of values, a pairing of parameters and values assigned to each parameter, or a markup language file, among others. A predetermined logical location is an absolute path according to a Universal Naming Convention (UNC). Predetermined logical location in distributed file system 305, in this case, identifies an eXtensible Markup Language (XML) file, /mnt/global-distributed-space/web-services/server.xml. An XML file is a file that conforms to a format defined by World Wide Web Consortium. For example, an XML file may satisfy of the requirements of extensible Markup Language (XML) 1.0 Specifications (1998 by World Wide Web Consortium). One or more embodiments of the invention may store addressing information to an addressing file. Addressing information is information that defines a logical address to transmit messages such that the creating/modifying instance may receive and handle such messages. Addressing information can include, an Internet protocol address and port to which the instance listens and may respond. Addressing information may also include a version number of the instance and a start time of the instance, among others.

Figure 4:
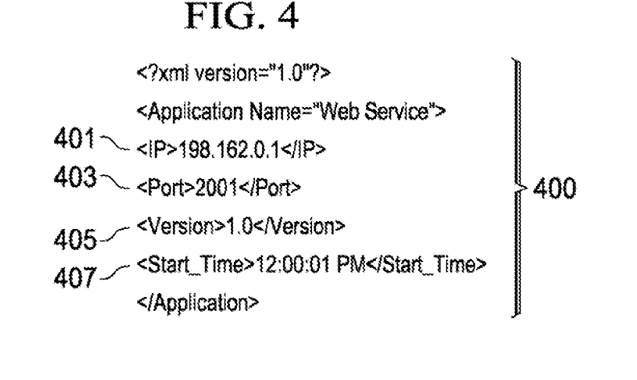
FIG. 4 shows an exemplary addressing file in accordance with an illustrative embodiment of the invention.

FIG. 4 shows an exemplary addressing file in accordance with an illustrative embodiment of the invention. Addressing file 400 comprises Internet protocol address 401, port 403, version number 405, and start time 407. An Internet protocol address is an address according to the standards promulgated by the Internet Engineering Task Force, and may be, for example, IPv4, IPv6, or any other Internet address form. A port is a virtual data connection that can be used by programs to exchange data directly. A version number is the number assigned a client-server program by an author or owner of the program. A start time is the time that the client-server program instance was invoked, and may be based on a local time of a processor where the instance runs, or be based on a universal time such as coordinated universal time (UTC). The XML file described above is merely an example of an addressing file. It is appreciated that other forms of addressing files may be possible, for example, a comma separated value file, and a file having predefined field widths for each field, among others.

Figure 5:
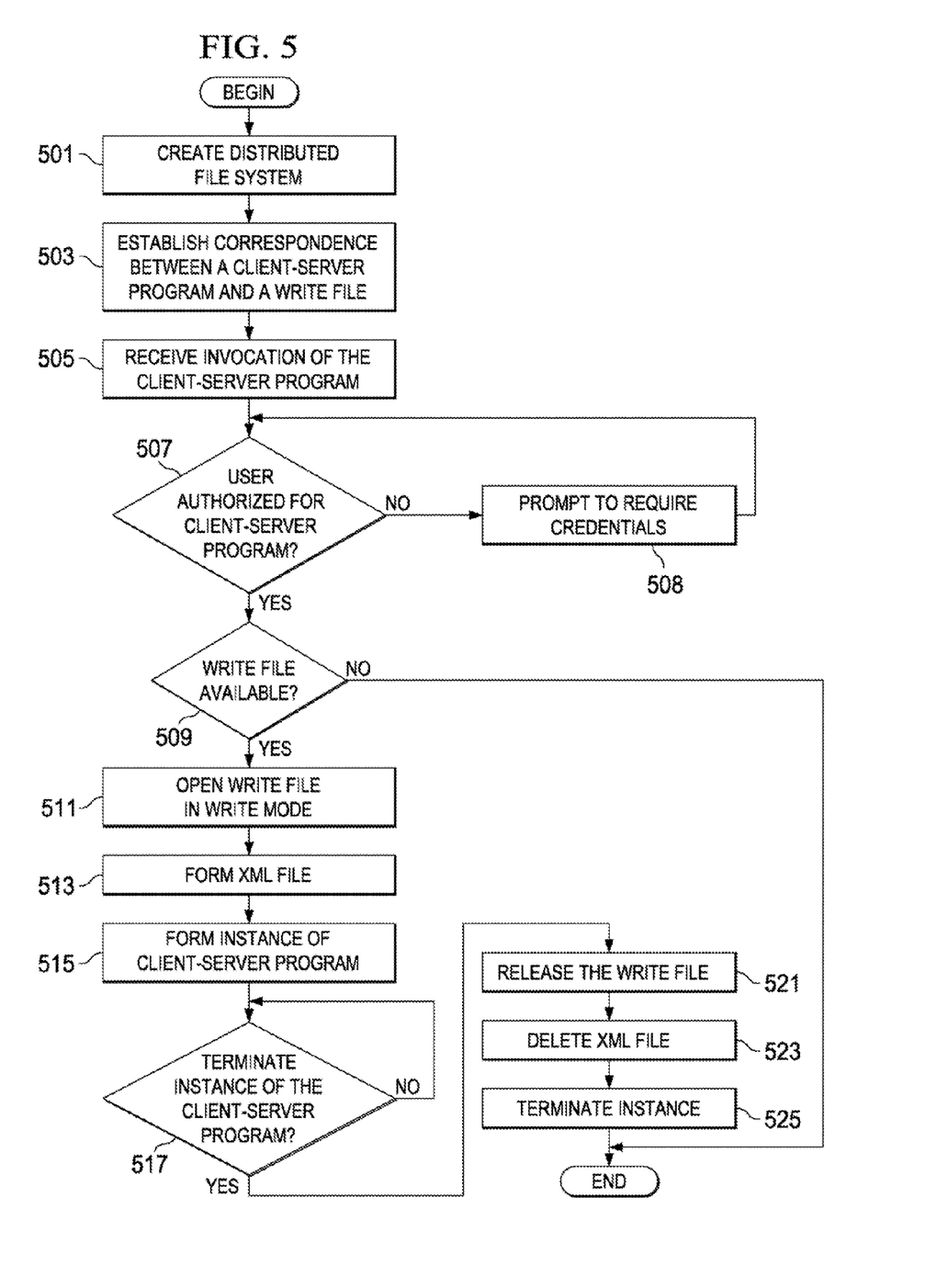
FIG. 5 is a flowchart of a method for limiting instances of a program in accordance with an illustrative embodiment of the invention.

FIG. 5 is a flowchart of a method for limiting instances of a program in accordance with an illustrative embodiment of the invention. Initially, a data processing system creates a distributed file system (step 501). The data processing system may be, for example, data processing system 210 of FIG. 2. The data processing system may create the distributed file system by establishing tables of authentication, communication, and other access information of corresponding members of the distributed file system. A corresponding member may be, in this case, data processing system 220. Further sub-steps to create the distributed file system may include establishing processes and daemons that comprise the file system layers, for example, file system layer 201 and file system layer 251.

Next, the data processing system may establish a correspondence between a client-server program and a write file (step 503). The data processing system may establish the correspondence by writing a table or other data structure into memory or non-volatile storage of one of the data processing systems of FIG. 2. The data processing system may include with client-server program and write file an entry for an addressing file, as shown, for example, in table 300 of FIG. 3. The data processing system may establish the table by cooperatively setting values, for example, by prompting an administrator of the data processing system to enter suitable file paths.

Next, the data processing system receives an invocation of a client-server program (step 505). The client-server program is sometimes called an application. The invocation may be directly by a user, or indirectly by a program operated under the control of the user. The data processing system may determine whether the user or calling program is authenticated and authorized to invoke the client server program (step 507). If the user is not authorized by step 507, the data processing system may prompt the user in order to acquire credentials (step 508). A credential is an identifier that is uniquely assigned to a user. A credential may have an indication of rights or permissions allowed to a user. Following step 508, the data processing system may re-execute step 507. The inbuilt security feature of authentication and authorization associated with some distributed file systems can be used to limit client-server program access to users with valid credentials. For example, this authentication feature may be used when the user invokes a program to write a file. The distributed file system processes can determine if a user's credentials are among the credentials authorized to access the file. Alternatively, the distributed file system processes can determine if the user's credentials are assigned to a group that has authorized access to the file. The authentication feature is available, for example in NFS V4 with enabled Kerberos authentication. Thus, a write file can be available based, in part, on whether a user has provided a credential, and the credential is matched directly, or indirectly to a list of users or groups that are permitted access to the write file.

A positive determination at step 507 causes the data processing system to determine whether a write file is available (step 509). A write file is available if the write file is not currently opened for writing. In addition, a write file can be available if the write file, as assigned to a client-server program, does not exist. A file system or a distributed file system sets at least one bit associated with a write file when the write file is opened for writing. When the write file is closed or no longer opened for writing, the file system or distributed file system resets the at least one bit. Thus, the bit operates to signal that the write file is either available or unavailable when the bit is in its set state or unset state, respectively. The bit may be set when at a logic one. Nevertheless, it is appreciated that some file systems and distributed file systems may establish a convention that the bit is set when at a logic zero. When the write file is unavailable, the write file is considered write locked or open in write-mode. A step 509 determination may be performed when a data processing system attempts to open a file by making a request to the file system layer to open the file. The file system layer may report an error or otherwise indicate a condition where the file exists, but is opened in write mode. An error is an inconsistency or an unavailability of hardware, data, and/or software. Alternatively, the file system layer may report the file as open for writing and permit further writing by the data processing system.

In the embodiment shown by FIG. 5, a determination that a write file is unavailable causes the data processing system to terminate processing. The data processing system may not permit an instance to be created in response to the determination that the write file is unavailable.

However, if the write file is available (a positive determination to step 509), the data processing system may open the write file in write mode (step 511). That is, the data processing system may set a bit that corresponds to the write file being opened in write mode. Consequently, step 511 makes the write file unavailable. Next, the data processing system forms an addressing file (step 513). In this example, the data processing system forms an XML file using a name associated with the client-server program. Other forms of addressing file may be used as explained in relation to FIG. 4, above. The name of the client-server program can operate as a key for looking up associated data from a table, for example, the table of FIG. 3. Thus, the addressing file name may be determined by retrieving the data from the addressing file field of the row accessed, for example, based on the key "web server." Details of the Internet protocol (IP) address and port number for the instance can be established by the instance coordinating with an operating system of the data processing system.

Next, the data processing system forms an instance of the client-server program (step 515). Forming an instance means that the data processing system assigns at least a program instruction pointer associated with the instance. Optionally, a process identifier and a priority may be assigned to the instance. The data processing system may set other variables to establish a state of the instance. In addition to establishing a state, step 515 may include the data processing system executing one or more instructions of the client-server program, and accordingly revising the state with each instruction.

Next, the data processing system may determine if a condition occurred to close or terminate the instance of the client-server program (step 517). A condition to close the instance may be, for example, receiving an updated or revised program, receiving a user indication to shutdown the application, or detecting a serious hardware fault, among others. If the result of step 517 is negative, step 517 is re-executed. Step 517 may involve executing some instructions of the client-server program.

However, if the result of step 517 is positive, the data processing system releases the write file (step 521). The data processing system takes the positive branch from step 517 when the client-server program is to terminate. Releasing means that the data processing system closes the write file such that the write file is no longer opened in write mode. This step may involve negating or inverting the bit set in step 511. Next, the data processing system may delete the addressing file (step 523). Next, the data processing system may terminate the instance (step 525). Terminating the instance means that all state data is re-allocated or marked for garbage collection. In addition, the storage for the program instruction pointer is re-allocated or otherwise made invalid. Processing terminates thereafter.

The embodiment illustrated in FIG. 5 may strictly limit the instance count of the client-server program to one. However, it may be desirable to limit the instance count to a more dynamic number.

Figure 6A:
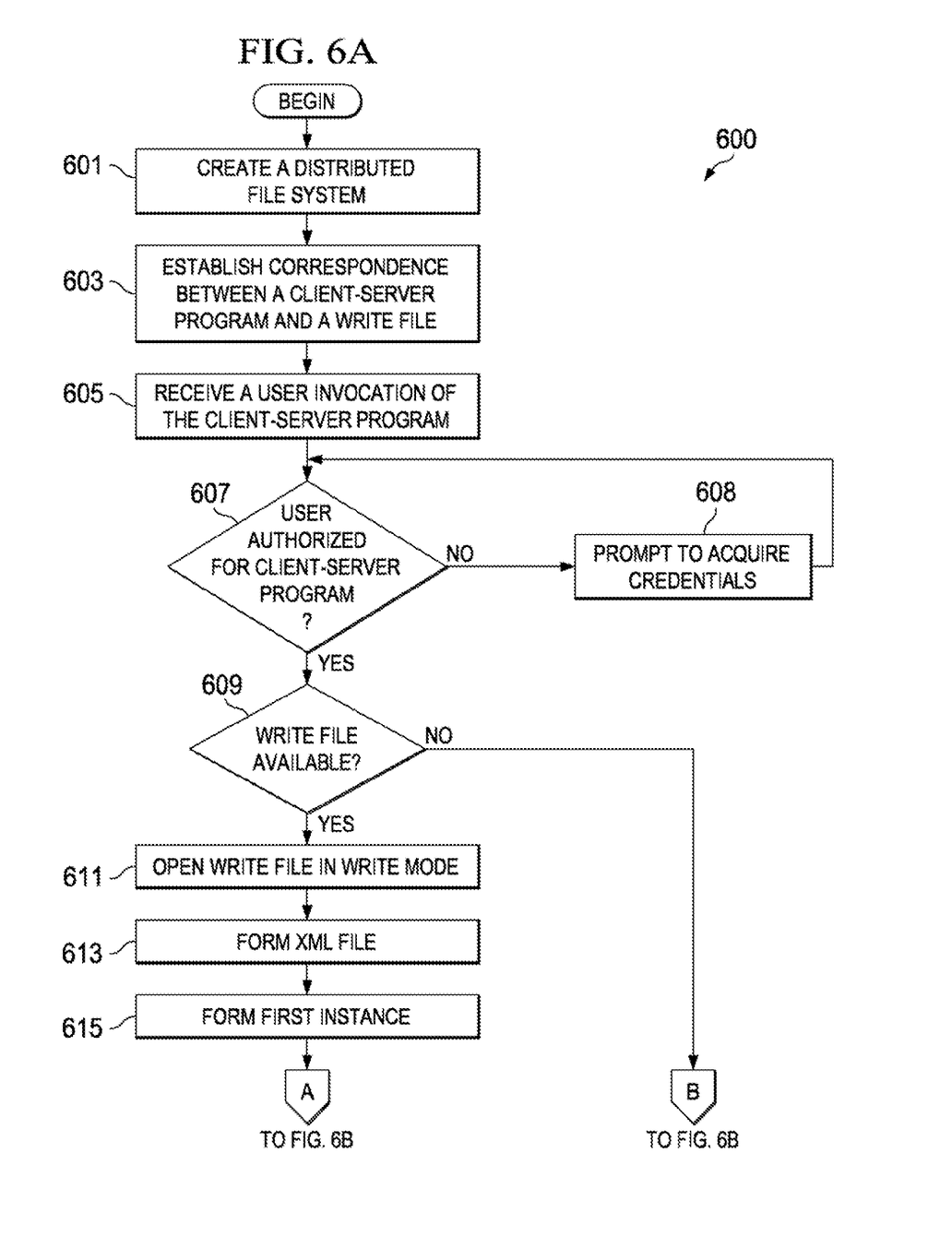
FIGS. 6A-6B are a flowchart of applying a business logic to allow a second instance to operate when a first instance exists for a client-server program in accordance with an illustrative embodiment of the invention.
Figure 6B:
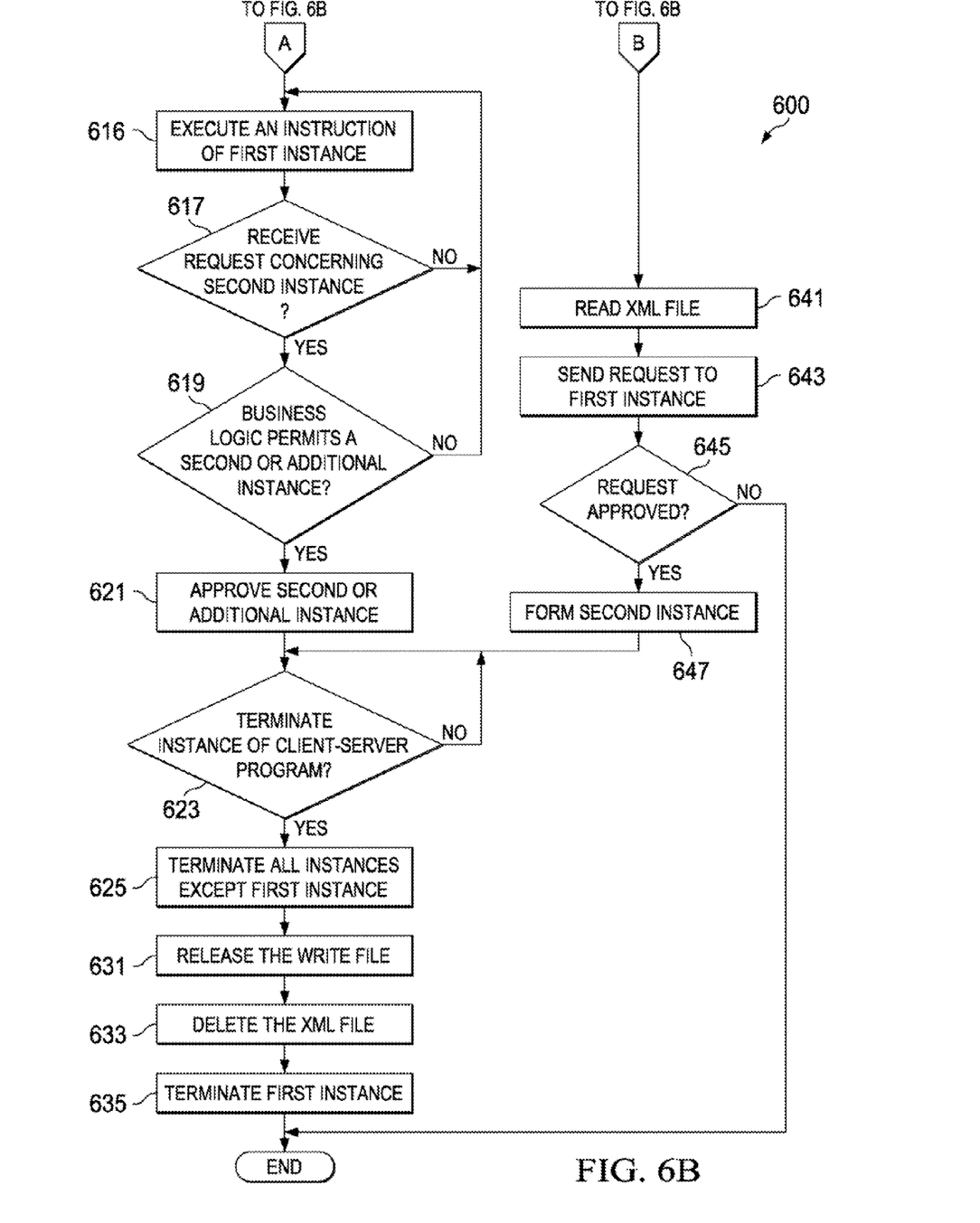

FIGS. 6A-6B are a flowchart of applying a business logic to allow a second instance to operate when a first instance of a client-server program operates in accordance with an illustrative embodiment of the invention. In contrast to the flowchart of FIG. 5, flowchart 600 does not necessarily inhibit forming a second instance when the write file is unavailable.

Initially, a data processing system creates a distributed file system (step 601). The data processing system may be, for example, data processing system 210 of FIG. 2. The data processing system may create the distributed file system by establishing tables of authentication, communication, and other access information of corresponding members of the distributed file system. A corresponding member may be, in this case, data processing system 220. Further sub-steps to create the distributed file system may include establishing processes and daemons that comprise the file system layers, for example, file system layer 201 and file system layer 251.

Next, the data processing system may establish a correspondence between a client-server program and a write file (step 603). The data processing system may establish the correspondence by writing a table or other data structure into memory or non-volatile storage of one of the data processing systems of FIG. 2. The data processing system may include with client-server program and write file an entry for an addressing file, as shown, for example, in table 300 of FIG. 3. The data processing system may establish the table by cooperatively setting values, for example, by prompting an administrator of the data processing system to enter suitable file paths.

Next, the data processing system receives an invocation of a client-server program (step 605). The invocation may be directly by a user, or indirectly by a program operated under the control of the user. The data processing system may determine whether the user or calling program is authenticated and authorized to invoke the client server program (step 607). If the user is not authorized by step 607, the data processing system may prompt the user in order to acquire credentials (step 608). Following step 608, the data processing system may re-execute step 607.

A positive determination at step 607 causes the data processing system to determine whether a write file is available (step 609). A write file is available if the write file is not currently opened for writing. A file system or a distributed file system sets at least one bit associated with a write file when the write file is opened for writing. When the write file is closed or no longer opened for writing, the file system or distributed file system resets the at least one bit. Thus, the bit operates to signal that the write file is either available or unavailable when the bit is in its set state or unset state, respectively. The bit may be set when at a logic one. Nevertheless, it is appreciated that some file systems and distributed file systems may establish a convention that the bit is set when at a logic zero. When the write file is unavailable, the write file is considered write locked or open in write-mode.

In the embodiment shown by FIGS. 6A-6B, a determination that a write file is unavailable causes the data processing system to read an addressing file, in this case, an XML file. Processing of the negative outcome is described further below.

However, if the write file is available (a positive determination to step 609), the data processing system may set a bit that corresponds to the write file being opened in write mode (step 611). Consequently, step 611 makes the write file unavailable. Next, the data processing system forms an addressing file (step 613). In this example, the data processing system forms an XML file using a name associated with the client-server program. Other forms of addressing file may be used as explained in relation to FIG. 4, above. The name of the client-server program can operate as a key for looking up associated data from a table, for example, the table of FIG. 3. Thus, the addressing file name may be determined by retrieving the data from the addressing file field of the row accessed, for example, based on the key "web server." Details of the Internet protocol (IP) address and port number for the instance can be established by the instance coordinating with an operating system of the data processing system.

Next, the data processing system forms a first instance of the client-server program (step 615). Optionally, a process identifier and a priority may be assigned to the instance. The data processing system may set other variables to establish a state of the instance. Next, the data processing system executes one or more instructions of the first instance (step 616).

Next, the data processing system determines whether a request is received concerning a second instance of the client-server program (step 617). The data processing system may receive a request when a second invocation of the program occurs, but the program is not yet instantiated a second time. Absent a request, the data processing system performs further instructions by re-executing step 616. However, if a request is received, the data processing system determines if a business logic permits additional instances to operate. A business logic is any criteria that allow multiple instances of a client-server program to execute contemporaneously. Business logic may be, for example, a criterion that the instance count for the client-server program be below a preset threshold. Business logic may be, for example, that a second instance may operate contemporaneously with a first instance in order to receive state information of the first instance such that a takeover of the processing by the second instance occurs.

A request facilitates the execution of a second instance. A request is a message transmitted to a data processing system concerning an invocation of a program. The request may be to an IP address and port to which the first instance is listening. The request can include details concerning a data processing system within which an additional instance will be formed, provided an approval of the request is permitted. In addition, the request can include an IP address and a port to which a response may be transmitted. After receiving a request concerning a second instance, the data processing system determines if business logic permits a second or additional instance (step 619). If the business logic does not permit an additional instance, the data processing system executes further instructions of the first instance in step 616.

However, if the data processing system produces a positive result at step 619, the data processing system may approve a second or an additional instance (step 621). Such an approval may include transmitting an approval using, for example, packets to an entity making the request. The approval may include additional instructions or conditions.

Next, the data processing system may determine if a condition occurred to close or terminate the instance of the client-server program (step 623). If not, then further instructions of the first instance are executed. Otherwise, the data processing system may terminate all instances of the client-server program except the first instance (step 625). Next, the data processing system may release the write file (step 631). Next, the data processing system may delete the addressing file, in this case an XML file (step 633). In addition, the data processing system may terminate the first instance (step 635). Processing terminates thereafter.

If, at step 609 the write file is not available, the data processing system reads the addressing file associated with the client-server program (step 641). As sub-step to step 641, the data processing system determines a way to address the first instance. For example, the data processing system may identify an IP address and port to which the first instance listens. Next, the data processing system may send a request to the first instance (step 643).

Next, the data processing system determines whether the request is approved (step 645). A request is approved when, for example, when the data processing system receives a packet responsive to the request from the data processing system that executes the first instance, as described above in relation to step 621. If the request is not approved, processing terminates as to the current invocation. However, if the request is approved, the data processing system forms a second or additional instance (step 647). The second instance may use the details within the addressing file to coordinate further activity with an earlier instantiated instance, for example, a first instance. Further processing may occur according to step 623, as described above.

The second instance may coordinate with the first instance. For example, the data processing system hosting the second instance may determine whether the second instance is allocated to a processor faster than a processor executing the first instance of the client-server program. The data processing system makes this determination taking into account the competing processes on the processor hosting the first instance and the competing processes on the processor hosting the second instance. If the business logic permits one instance to execute contemporaneously within the distributed file system but allows two to execute for purposes of takeover of the functions, then the data processing system may rewrite the addressing file. The data processing system may rewrite the addressing file so that the addressing file provides operational details of the second data processing system. In other words, the addressing file points to the second data processing system such that future requests will be transmitted to the second instance on the data processing system. Once all other state information of the first instance is transferred to the second instance, the first instance may terminate. Subsequently, instructions of the second instance may operate as if the second instance were the first instance.

Another arrangement of the business logic is one in which the business logic keeps an accounting of the instance count. In other words, when a new instance is permitted, the business logic may increment the instance count. The new instance may be permitted based on comparing a current instance count with a pre-established upper limit. If the current instance count is below the pre-established upper limit, the business logic permits an additional instance to be instantiated. Similarly, if the data processing system terminates one or more instances of the client-server program, the data processing system may decrement the number of instances accordingly.

Thus, a data processing system implemented according to an embodiment of the invention may regulate execution of instances of a client-server program among the data processing systems comprising a distributed file system. In addition, aspects of the invention permit a second instance of a client-server program to communicate and coordinate with a first instance of the client-server program, despite the presence of heterogeneous platform in the distributed file system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others or ordinary skill in the art to understand the invention for various embodiments with various modifications as are suited to the particular use contemplated.

What is claimed is:

1. A computer implemented method for limiting instances of a client-server program within a plurality of platforms in a restricted distributed network comprising:

receiving an invocation of the client-server program;

assigning a write file to the client-server program wherein the write file has a write file name and the write file is on a distributed file system accessible to the plurality of platforms;

determining whether the write file is available;

responsive to a determination that the write file is available, opening the write file for writing wherein the write file is associated with the client-server program;

responsive to a determination that the write file is available, forming an addressing file having addressing information of a first instance of the client-server program, wherein forming the addressing file comprises assigning a program instruction pointer associated with the first instance of the client-server program;

responsive to a determination that the write file is available, reporting the addressing file by writing addressing information to the addressing file, wherein the addressing file is established at a predetermined logical location in the distributed file system;

responsive to the determination that the write file is available, executing at least one instruction of the client-server program;

receiving a request from a second instance of the client-server program;

incrementing an instance count based on the instance count and a business logic, wherein an instance count is a number of instances of a program that counts instances that have been invoked but not yet completed;

approving the request based on the instance count and the business logic;

determining whether the second instance is allocated to a processor faster than a processor executing the first instance of the client-server program;

rewriting the addressing file to point to the second instance of the client-server program, whereby the second instance operates as the first instance of the client-server program; and terminating the first instance of the client-server program based on an instance count comparison to a pre-established upper limit.

2. The computer implemented method of claim 1, wherein the addressing file is an eXtensible Markup Language file defining an Internet protocol address.

3. The computer implemented method of claim 1, wherein the step of determining further comprises:

attempting to open the write file in write mode; and receiving an error.

4. The computer implemented method of claim 1, wherein the addressing file is an eXtensible Markup Language file defining at least one selected from the group consisting of an Internet protocol address, a port, a version number, and a start time.

5. The computer implemented method of claim 1, further comprising:

determining whether the first instance of the client-server program is to terminate;

responsive to a determination that the first instance of the client-server program is to terminate, releasing the write file; and responsive to a determination that the first instance of the client-server program is to terminate, deleting the addressing file.

6. A data processing system comprising:

a bus;

a storage device connected to the bus, wherein computer usable code is located in the storage device;

a communication unit connected to the bus;

a processing unit connected to the bus, wherein the processing unit executes the computer usable code for limiting instances of a client-server program within a plurality of platforms in a restricted distributed network, the processing unit further executes the computer usable code to receive an invocation of the client-server program; assign a write file to the client-server program wherein the write file has a write file name and the write file is on a distributed file system accessible to the plurality of platforms; determine whether the write file is available; responsive to a determination that the write file is available, open the write file for writing wherein the write file is associated with the client-server program; responsive to a determination that the write file is available, form an addressing file having addressing information of a first instance of the client-server program, wherein forming the addressing file comprises assigning a program instruction pointer associated with the first instance of the client-server program; responsive to a determination that the write file is available, report the addressing file by writing addressing information to the addressing file, wherein the addressing file is established at a predetermined logical location in the distributed file system; and responsive to the determination that the write file is available, execute at least one instruction of the client-server program; receive a request from a second instance of the client-server program; increment an instance count based on the instance count and a business logic, wherein an instance count is a number of instances of a program that counts instances that have been invoked but not yet completed; approve the request based on the instance count and the business logic; determine whether the second instance is allocated to a processor faster than a processor executing the first instance of the client-server program; rewrite the addressing file to point to the second instance of the client-server program, whereby the second instance operates as the first instance of the client-server program; and terminate the first instance of the client-server program based on an instance count comparison to a pre-established upper limit.

7. The data processing system of claim 6, wherein the addressing file is an eXtensible Markup Language file defining an Internet protocol address.

8. The data processing system of claim 6, wherein in executing the computer usable code to determine the processing unit further executes the computer usable code to attempt to open the write file in write mode; and receive an error.

9. The data processing system of claim 6, wherein the addressing file is an eXtensible Markup Language file defining at least one selected from the group consisting of an Internet protocol address, a port, a version number, and a start time.

10. The data processing system of claim 6, wherein the processing unit further executes the computer usable code to determine whether the first instance of the client-server program is to terminate; responsive to a determination that the first instance of the client-server program is to terminate, release the write file; and responsive to a determination that the first instance of the client-server program is to terminate, delete the addressing file.

11. A computer program product for limiting instances of a client-server program within a plurality of platforms in a restricted distributed network, the computer program product comprising:

computer usable program code for receiving an invocation of the client-server program;
 computer usable program code for assigning a write file to the client-server program wherein the write file has a write file name and the write file is on a distributed file system accessible to the plurality of platforms;
 computer usable program code for determining whether the write file is available;
 computer usable program code for opening the write file for writing wherein the write file is associated with the client-server program, responsive to a determination that the write file is available;
 computer usable program code for forming an addressing file having addressing information of a first instance of the client-server program, responsive to a determination that the write file is available, wherein forming the addressing file comprises assigning a program instruction pointer associated with the first instance of the client-server program;
 computer usable program code for reporting the addressing file by writing addressing information to the addressing file, responsive to a determination that the write file is available, wherein the addressing file is established at a predetermined logical location in the distributed file system;
 computer usable program code for executing at least one instruction of the client-server program, responsive to the determination that the write file is available;
 computer usable program code for receiving a request from a second instance of the client-server program;
 computer usable program code for incrementing an instance count based on the instance count and a business logic, wherein an instance count is a number of instances of a program that counts instances that have been invoked but not yet completed;
 computer usable program code for approving the request based on the instance count and the business logic;
 computer usable program code for determining whether the second instance is allocated to a processor faster than a processor executing the first instance of the client-server program;
 computer usable program code for rewriting the addressing file to point to the second instance of the client-server program, whereby the second instance operates as the first instance of the client-server program; and
 computer usable program code for terminating the first instance of the client-server program based on an instance count comparison to a pre-established upper limit.

12. The computer program product of claim 11, wherein the addressing file is an eXtensible Markup Language file defining an Internet protocol address.

13. The computer program product of claim 11, wherein the computer usable program code for determining further comprises:

computer usable program code for attempting to open the write file in write mode; and
 computer usable program code for receiving an error.

14. The computer program product of claim 11, wherein the addressing file is an eXtensible Markup Language file defining at least one selected from the group consisting of an Internet protocol address, a port, a version number, and a start time.

* * * * *